June 11, 1935.　　A. FERRARI ET AL　　2,004,860

BUNG FAUCET

Filed March 6, 1935

A. Ferrari
M. Scalione
C. Rafanelli

Inventors

By C. A. Snow & Co.

Attorneys.

Patented June 11, 1935

2,004,860

UNITED STATES PATENT OFFICE 2,004,860

BUNG FAUCET

Abele Ferrari, Mario Scalione, and Cesare Rafanelli, Healdsburg, Calif.

Application March 6, 1935, Serial No. 9,676

1 Claim. (Cl. 251—50)

This invention relates to a faucet of the type known as a "bung faucet" and while it is especially adapted for use in connection with wine tanks, it is to be understood that it can be used to advantage with other structures.

It is an object of the invention to provide a faucet which can be screwed readily into the tank or other structure from which fluid is to be drawn, the valve of the faucet being located where it will be supported inside of the container and will be normally seated against the inner end of the faucet thereby to seal it.

A further object is to provide simple and efficient means operable from a point adjacent the discharge end of the faucet for unseating the valve.

Another object is to provide simple means for regulating the movement of the valve by its operating means.

A further object is to provide a bung faucet which is simple and compact in construction, will not readily get out of order, and which can be applied easily.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawing the preferred form of the invention has been shown.

In said drawing

Figure 1:
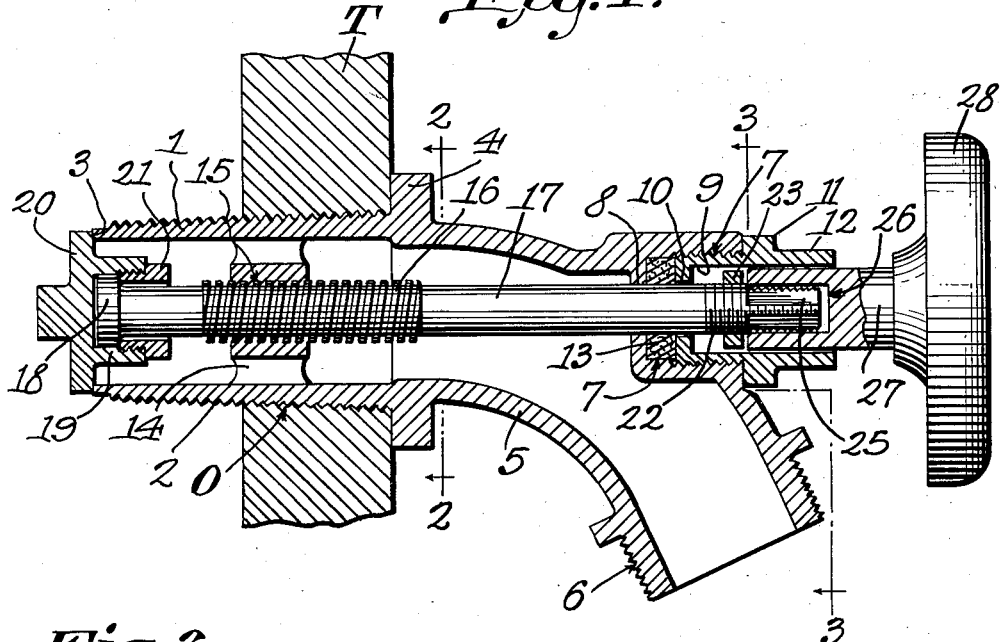
Figure 1 is a vertical longitudinal section through the bung faucet in engagement with a tank, a portion of which has been shown.
Figure 2:
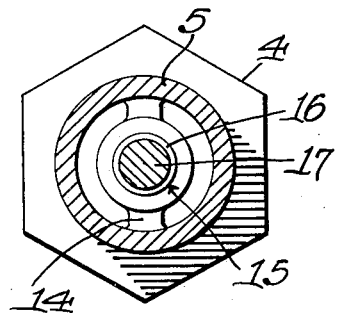
Figure 2 is a section on line 2—2, Figure 1.
Figure 3:
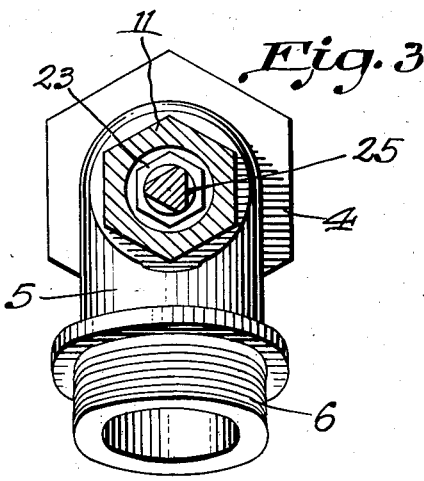
Figure 3 is a section on line 3—3, Figure 1.

Referring to the figures by characters of reference, 1 designates the tapered end portion of the bung faucet which is provided on its outer face with a screw thread 2 designed for engaging the wall of a wooden tank T such as used for holding wine. The small end of this tapered portion constitutes a valve seat 3 while the large end of the tapered portion has an angular annular flange 4 constituting a nut whereby the bung portion 1 can be screwed readily into an opening O provided therefor.

The other end portion of the device is curved downwardly to provide an outlet spout 5 the free end of which is exteriorly screw threaded as shown at 6, to engage with a hose or the like.

Arranged in axial alinement with the bung portion 1 is an interiorly screw threaded recess 7 extending into the spout 5 from the front portion thereof. The inner end or wall of this recess has an opening 8 therein while the outer end is adapted to receive a screw threaded cup 9 also provided with an opening 10. This cup has an annular angular flange 11 constituting a nut and a tubular boss or extension 12 projects from the flange, the opening therein coinciding with the recess in the cup 9.

A packing disk 13 or the like is adapted to be seated in recess 7 between the inner end thereof and the adjacent end of the cup 9 so as to cooperate with these parts to form a packing.

A spider 14 is formed within the bung portion 1 and has a threaded opening 15 in axial alinement with said bung portion. In this opening is engaged the threaded portion 16 of a valve stem 17. This stem is slidably mounted in the openings 8 and 10 and is surrounded by the packing 13. One end of the stem has a round head 18 seated within a boss 19 which is concentrically formed on one face of a disk 20 constituting the valve of the faucet. This disk is of such diameter as to bear against the seat 3 when the valve is closed. A tubular nut 21 is screwed into the boss 9 and laps the head 18 so that the valve is thus held securely to the stem 17 but said stem is free to rotate independently of the valve.

Figure 4:
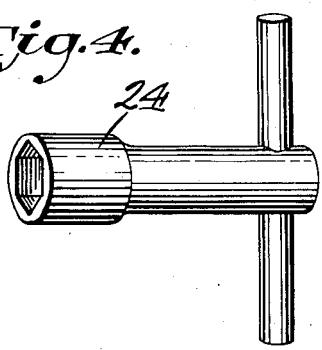
Figure 4 is a perspective view of a key which can be employed for adjusting the valve.

The other end of the stem is screw threaded as shown at 22 and projects into the cup 9 and its extension 12. On this screw threaded portion is mounted a nut 23 which is adjustable therealong so as to limit the sliding movement of the stem. The periphery of the nut is spaced from the wall of the recess 9 so that a suitable socket wrench such as shown at 24 in Figure 4 can thus be inserted into the extension 12 and cup 9 so as to engage the nut 23 and rotate it.

The end portion of the stem 17 can be made angular in cross section as indicated at 25 so as to be detachably engaged by the recess end 26 of a stem 27 extending from a hand wheel 28 or the like.

Normally the valve 20 is pressed against the seat 3 so as to seal it, said valve being held in this position by the stem 17 which is in screw threaded engagement with the spider 14. While the hand wheel is out of position, key 24 can be inserted into engagement with nut 23. This nut can be screwed against the inner end of the cup 9 to lock the stem against sliding movement or it can be adjusted away from the inner end of the cup to permit a limited movement of the valve stem. In the drawing it has been shown in this last-mentioned position.

When it is desired to open the valve the hand wheel is placed with its stem 27 in engagement with the angular end 25 of stem 17. The wheel is then rotated in one direction so as to rotate stem 17 and cause the screw 16 to feed the stem longitudinally and push valve 20 away from its seat. The threads 16 can be pitched so as to produce a quick unseating of the valve. It will be understood, however, that the movement of the valve will be limited by the nut 23.

As the valve has a swivel connection with its stem it will be apparent that after the valve touches its seat it will not rotate thereon but will be pulled tightly thereagainst by the rotating stem.

What is claimed is:

A bung faucet including a tapered screw threaded bung portion one end of which constitutes a valve seat, there being a spout extending from the other faucet end portion, said spout having a recess in the wall thereof in axial alinement with the bung portion, a cup adjustably seated in the recess, packing material interposed between the cup and the inner end of the recess, a screw threaded stem, means in the bung portion for supporting the stem and feeding it longitudinally when the stem is rotated, a valve carried by one end of the stem and movable against the seat, means within the cup and adjustable on the other end of the stem for limiting the longitudinal movement of the stem, and means detachably mounted in the cup for engaging and actuating the stem.

ABELE FERRARI.
MARIO SCALIONE.
CESARE RAFANELLI.